Oct. 24, 1939.  R. P. LANSING  2,177,199
POWER PLANT
Filed March 2, 1937
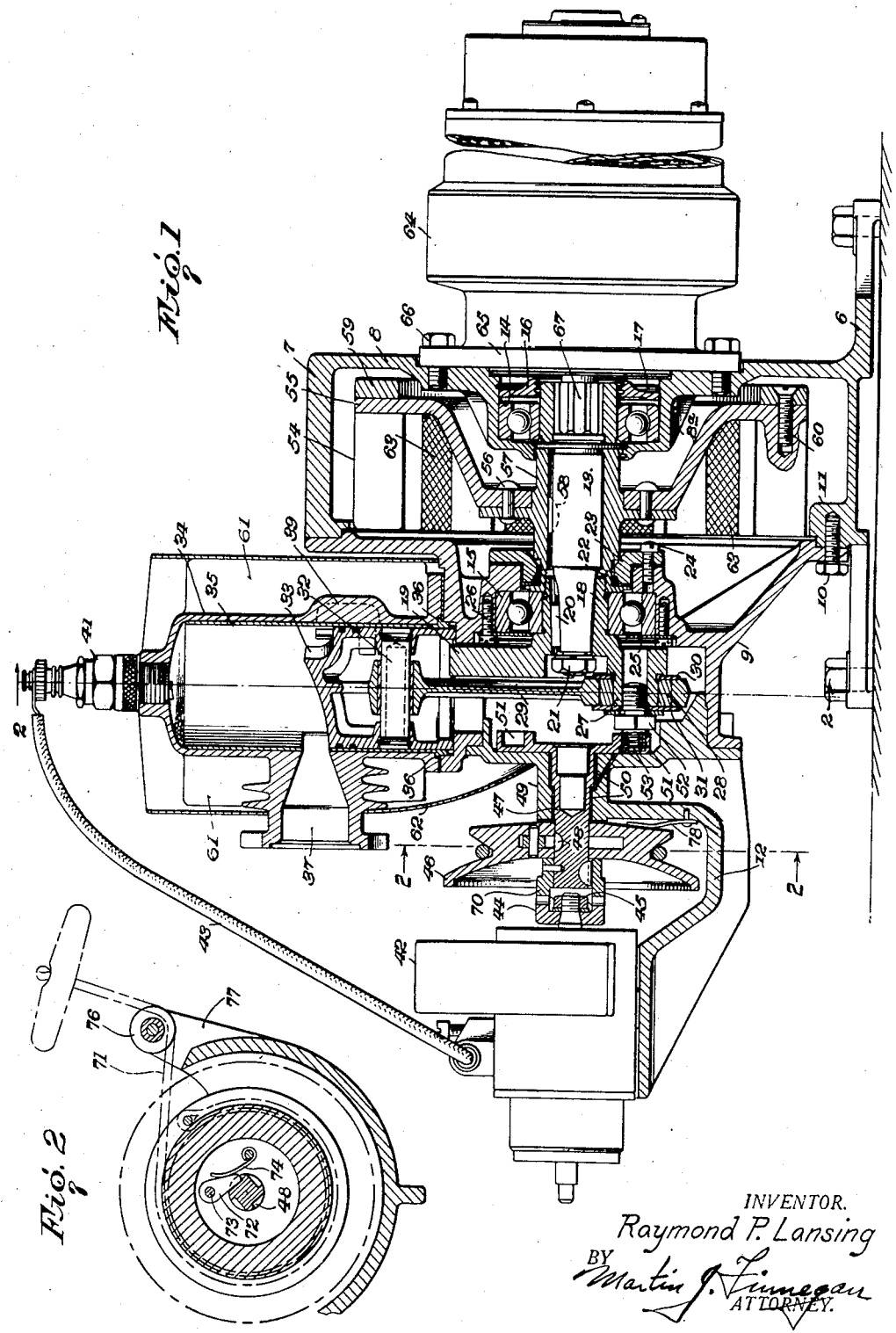
INVENTOR.
Raymond P. Lansing
BY
Martin J. Finnegan
ATTORNEY.

Patented Oct. 24, 1939

2,177,199

UNITED STATES PATENT OFFICE 2,177,199

POWER PLANT

Raymond P. Lansing, Montclair, N. J., assignor to Eclipse Aviation Corporation, East Orange, N. J., a corporation of New Jersey Application March 2, 1937, Serial No. 128,673

8 Claims. (Cl. 123—179)

This invention relates to power plants and more particularly to a power plant of the internal combustion engine type.

An object of the invention is to provide a power plant of light weight, embodying in combination, an internal combustion engine and ignition current generating means.

A still further object is to provide novel means for controlling the starting and the timing of the engine ignition current. The above and other objects will appear more fully hereafter in a detailed description of the invention.

One embodiment of the present invention is shown in the accompanying drawing but it is to be expressly understood that the drawing is for purposes of illustration only and is not designed as a definition of the limits of the invention, reference being had for this purpose to the appended claims.

In the drawing, wherein like reference characters refer to like parts throughout the several views, Fig. 1 is a side elevation partly in axial section and with parts broken away illustrating one embodiment of the present invention; and Fig. 2 is a transverse view along line 2—2 of Fig. 1.

Referring to the embodiment of the invention illustrated in Fig. 1, the said embodiment includes an engine adapted to drive a generator, the apparatus being mounted on a base 6 that is preferably constituted by an aluminum casting. Projecting upwardly from base 6 and formed integrally therewith, is a cylindrical housing 7 provided with an end wall 8. The opposite end wall of housing 7 is constituted by a casting 9 which projects upwardly from the base 6 and is secured as by means of screws 10 to a lug 11 provided on said base. Casting 9 supports a laterally projecting casting 12, the inner portion of which coacts with casting 9 to form the engine crankcase, the two castings being secured together in any suitable manner as by means of screws (not shown).

End wall 8 and casting 9 support a crankshaft 13 which is rotatably mounted adjacent its opposite ends as by means of ball bearings 14 and 15. Ball bearing 14 is positioned in an enlarged portion 8a formed centrally of the end wall 8. A retaining plate 16 is provided for the bearing 14, said ring being held in position by means of a locking ring 17.

The inner race of bearing 15, which bearing is mounted centrally of costing 9, does not have direct engagement with the crankshaft 13 but engages the hub portion 18 of a counterweighted crank arm 19 that is drivably connected to the inner tapered end of said crankshaft by means of a key 20. Longitudinal movement of crank arm 19 relative to shaft 13 is prevented by means of a nut 21 that is threaded on the inner end of the crankshaft and bears against a suitable shoulder on said arm, the latter being recessed to receive said nut. The outer end of the hub portion of the crank arm is threaded to receive a retainer 22 for the inner race of ball bearing 15, the opposite end of the race bearing against a shoulder formed on the counterweight. Retainer 22, which is L-shaped in cross section, is prevented from moving longitudinally in one direction by a retaining member 23 which is likewise L-shaped in cross section and is secured to the central portion of casting 9 by means of screws 24. A retaining ring 25 that is attached to the casting 9, as by means of screws 26, is provided for the outer race of bearing 15.

The crank arm 19 carries a crank pin 27 on which is rotatably mounted, by means of a suitable bearing 28, the lower end of a connecting rod 29. Retaining rings 30 and 31 are provided on the crank pin 27 for bearing 28. The upper end of the connecting rod carries a wrist pin 32 that is secured in any suitable manner to a piston 33. Said piston is preferably formed of aluminum and is adapted to reciprocate in a cylinder 34 which is also preferably formed of aluminum and is provided with a steel or other suitable liner 35. The lower end of liner 35 is provided with a circular shoulder 36 which extends into a recess in the bottom of the cylinder walls, the recess being so formed that the shoulder is clamped between the cylinder and the upper surface of casting 9 by bolts or screws (not shown).

An exhaust port 37 and an inlet port 38 are provided for the cylinder and since the engine is of the two-cycle type the cylinder is also provided with the usual by-pass 39. Secured to the flanged end of the walls of the inlet port 38 is a carburetor 40 of any suitable type and a spark plug 41 is fitted in the usual manner into the upper end of the cylinder.

Means are provided for supplying current to the spark plug to ignite the combustion charge in the cylinder. As shown, said means are constituted by a magneto 42 that is mounted on the upper surface of casting 12 and is electrically connected to the spark plug through a wire 43 leading from the secondary winding of the induction coil whose primary circuit is periodically interrupted through the usual circuit breaker, not shown in detail but preferably mounted within the magneto housing and including an interrupter device rotatable on the magneto shaft, or an extension thereof. At the other end of the magneto shaft there is a coupling member 44 which is drivably connected thereto as by means of a nut 45. The inner end of member 44 is splined or toothed to engage the similarly formed clutch jaw 70 shown secured to the end of stub shaft 47. A pulley 46 is also drivably connected to the stub shaft 47 by a ratchet and pawl combination shown in transverse view in Fig. 2, and constituting means for facilitating starting of the engine and subsequent re-winding of the starting cable 71 about the cable receiving groove of the pulley 46. As shown such means includes one or more pawls 72, each pivotally mounted on a pin 73 journalled in the pulley, and spring means 74 to urge each pawl into driving relation to the ratchet teeth 48 cut in the periphery of stub shaft 47. A roller 76 mounted in bracket 77 serves as a guide for the cable as it is unwound (during starting) and also during subsequent rewinding—such rewinding being readily effected at any convenient time, by manually turning the pulley in the overrunning (rewinding) direction.

The stub shaft is rotatably mounted in a bearing portion 49 provided in the casting 12, bushings 50 preferably being interposed between said stub shaft and the bearing portion of the casting. The inner end of stub shaft 47 is provided with a flange in which are formed one or more recesses or sockets 51, into one of which extends a connecting pin or stud 52 threaded into the hollow end of the crank pin 27. A coil spring 53 is mounted in a sleeve on the stud 52 and the socket to prevent lost motion between the parts, and to tend to seal the parts against the escape of oil from the crankcase, by exerting a pressure tending to hold the flanged end of shaft 47 tightly against the crankcase wall. Should any oil pass to the bearing portion 49, notwithstanding this oil seal, it can return to the crankcase rather than escape, there being a return drain drilled diagonally through the crankcase wall, as shown at 53a.

Cooling means are provided for the engine and in order to obtain light weight, the engine is of the air-cooled type. The cooling means comprise a fan having blades 54 which are free at one end but are integral at their opposite ends with a disc wheel 55 secured, as by means of rivets 56, to the flange of a hub 57 that is drivably connected to the intermediate portion of crankshaft 13, by a key 58. The wheel is strengthened adjacent its periphery by means of a ring 59 which is secured to the outer face of said wheel by screws 60. All of the parts of the fan are preferably formed of aluminum or a suitable aluminum alloy and are housed in the cylindrical casing 7. The fan also serves as a flywheel.

Rotation of the fan serves to draw air into housing 7 which is provided with suitable openings 63 in the side walls thereof through which the air passes. Wire netting covers the openings 63 and prevents foreign matter from entering the housing and damaging the blades of the fan.

The engine is adapted to drive a generator 64 having a casing which is provided on its inner end with a flange 65 that is adapted to be secured to the end wall of housing 7 by screws 66. The inner end of the armature shaft of generator 64 is exteriorly splined as at 67 to engage splines formed interiorly of the hollow end of the crankshaft 13. The generator can thus be readily detached and replaced by a generator of a different size.

When it is desired to start the engine the flexible cable 71 is wound around the pulley 46, the magneto and timer having first been adjusted to give the proper spark control and the carburetor throttle valve is adjusted. With the magneto 42 temporarily shifted out of operating position on platform 12, the spark adjustment may be made by turning coupling 44 through a portion of a revolution, to bring a different angular relation with the stub shaft 47, thereby varying the "timing" of the ignition. When a pull is exerted on the cable the crankshaft is caused to turn by the action of pawl 72 on ratchet teeth 48, as above described. As soon as the impetus thus imparted enables the engine to develop its own momentum to continue in operation and drive the generator 64 or other load, the ratchet teeth 48 will overrun the pawl 72 and pulley 46, the latter being yieldably restrained against any tendency to follow along by the frictional pressure of spring 78 on the surface of said pulley. The fan prevents overheating of the parts and also constitutes a flywheel. The engine is adapted for high speed operation, and is so light in weight that one man can readily carry it from one location to another, if desired.

This application is a continuation, in part, of my co-pending application No. 698,214 filed November 15, 1933, as a division of my earlier application No. 316,583 filed November 1, 1928.

What is claimed is:

1. A magneto drive comprising a pair of shafts, one of said shafts having one end of relatively small diameter and its opposite end terminating in a flange of relatively large diameter provided with a pocket near its periphery, means carried in the pocket of said flange for drivably connecting said two shafts, and resilient means also carried in said pocket for yieldably holding the flanged portion of said shaft in position tending to prevent passage of lubricant along the surface of said shaft.

2. In combination with a cylinder supporting crankcase having over-lapping sections, one of which terminates in a plane substantially coincident with the center line of the supported cylinder, and the other of which terminates in a mounting flange parallel with said center line, an oil return drain extending through said first-named crankcase section, a shaft having a driving flange extending into said crankcase and overlying the delivery end of said oil return drain, and resilient means for yieldably holding said flange in rubbing contact with said first-named crankcase section, to impede the flow of oil along said shaft and drain.

3. In combination with a piston having a crankshaft connected therewith, supporting means for said crankshaft, said supporting means comprising a crankcase having over-lapping sections, one of which terminates in a plane substantially coincident with the center line of said piston and the other of which extends across the entire projected area of the piston, a magneto drive shaft supported by said crankcase, means for drivably connecting said magneto drive shaft with said piston, and manually operable means for rotating said magneto drive shaft, said manually operable means including a pulley and a one-way driving connection between said pulley and said magneto drive shaft.

4. In combination with a piston having a crankshaft connected therewith, supporting means for said crankshaft, said supporting means comprising a crankcase having over-lapping sections, one of which terminates in a plane substantially coincident with the center line of said piston and the other of which extends across the entire projected area of the piston, a magneto drive shaft supported by said crankcase, means for drivably connecting said magneto drive shaft with said piston, means including a starting pulley adapted, first, to drive and then to overrun said magneto drive shaft, and a spark adjusting, driving connection between said drive shaft and magneto, said driving connection also serving to prevent outward lateral displacement of said starting pulley.

5. In combination with a piston having a crankshaft connected therewith, supporting means for said crankshaft, said supporting means comprising a crankcase having over-lapping sections, one of which terminates in a plane substantially coincident with the center line of said piston and the other of which extends across the entire projected area of the piston, a magneto drive shaft supported by said crankcase, means for drivably connecting said magneto drive shaft with said piston, a piston starting pulley adapted, first, to drive and then to overrun said magneto drive shaft, a spark adjusting, driving connection between said drive shaft and magneto, said driving connection also serving to prevent outward lateral displacement of said starting pulley, and resilient means yieldably opposing inward lateral displacement of said starting pulley.

6. In combination with a magneto, a cylinder supporting crankcase having overlapping sections, one of which terminates, at one end, in a plane substantially coincident with the center line of the supported cylinder, and at the other end in a platform to receive and support said magneto, said crankcase section having an intermediate, cup-shaped portion integral with said platform portion, means including a starting pulley for transmitting initial rotary movement to said magneto, and means mounted on said cup-shaped portion of said crankcase section for exerting frictional restraint upon said pulley to retard the rotation thereof whenever the rotational speed of the magneto exceeds that of the pulley.

7. The combination with a crankcase having a cylinder mounted thereon, a flanged shaft rotatable with respect to said crankcase, a piston reciprocable in said cylinder, and means for translating the reciprocation of said piston into rotary movement of said flanged shaft, said means including a crankshaft rotatable within said crankcase, a pin engaging said crankshaft at one end and fitting within a recess in the flanged portion of said flanged shaft at its other end, and resilient means also disposed within said recessed portion for constantly urging the flanged portion of said shaft into rubbing contact with the wall of said crankcase, to impede escape of lubricant therefrom.

8. The combination with a crankcase having a cylinder mounted thereon, a flanged shaft rotatable with respect to said crankcase, a piston reciprocable in said cylinder, and means for translating the reciprocation of said piston into rotary movement of said flanged shaft, said means including a crankshaft rotatable within said crankcase, a pin threadedly engaging said crankshaft at one end and fitting within a recess in the flanged portion of said flanged shaft at its outer end, and resilient means also disposed within said recessed portion for constantly urging the flanged portion of said shaft into rubbing contact with the wall of said crankcase, to impede escape of lubricant therefrom, the effectiveness of said resilient means being adjustable in accordance with the degree of the threaded relationship between said threaded pin and crankshaft.

RAYMOND P. LANSING.